(12) United States Patent
Moyer

(10) Patent No.: US 11,836,085 B2
(45) Date of Patent: Dec. 5, 2023

(54) CACHE LINE COHERENCE STATE UPGRADE

(71) Applicant: Advanced Micro Devices, Inc., Santa Clara, CA (US)

(72) Inventor: Paul J. Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/514,792

(22) Filed: Oct. 29, 2021

(65) Prior Publication Data
US 2023/0136114 A1   May 4, 2023

(51) Int. Cl.
G06F 12/08 (2016.01)
G06F 12/0891 (2016.01)
G06F 9/30 (2018.01)
G06F 12/0831 (2016.01)

(52) U.S. Cl.
CPC ...... *G06F 12/0891* (2013.01); *G06F 9/30043* (2013.01); *G06F 9/30047* (2013.01); *G06F 12/0833* (2013.01)

(58) Field of Classification Search
None
See application file for complete search history.

(56) References Cited

U.S. PATENT DOCUMENTS

| | | | |
|---|---|---|---|
| 6,260,117 B1 * | 7/2001 | Freerksen | G06F 12/0811 711/146 |
| 11,487,672 B1 * | 11/2022 | Rhee | G06F 12/0891 |
| 2002/0087807 A1 | 7/2002 | Gharachorloo et al. | |
| 2002/0124143 A1 | 9/2002 | Barroso et al. | |
| 2002/0147889 A1 * | 10/2002 | Kruckemyer | G06F 12/0831 711/144 |
| 2006/0277370 A1 | 12/2006 | Guthrie et al. | |
| 2014/0156931 A1 * | 6/2014 | Krick | G06F 12/0811 711/119 |
| 2015/0378908 A1 | 12/2015 | Gschwind et al. | |
| 2017/0315916 A1 | 11/2017 | Cheng et al. | |
| 2018/0004663 A1 * | 1/2018 | Jalal | G06F 12/0811 |

* cited by examiner

*Primary Examiner* — Tracy C Chan
(74) *Attorney, Agent, or Firm* — Volpe Koenig

(57) ABSTRACT

Techniques for performing cache operations are provided. The techniques include, recording an entry indicating that a cache line is exclusive-upgradeable; removing the cache line from a cache; and converting a request to insert the cache line into the cache into a request to insert the cache line in the cache in an exclusive state.

48 Claims, 6 Drawing Sheets

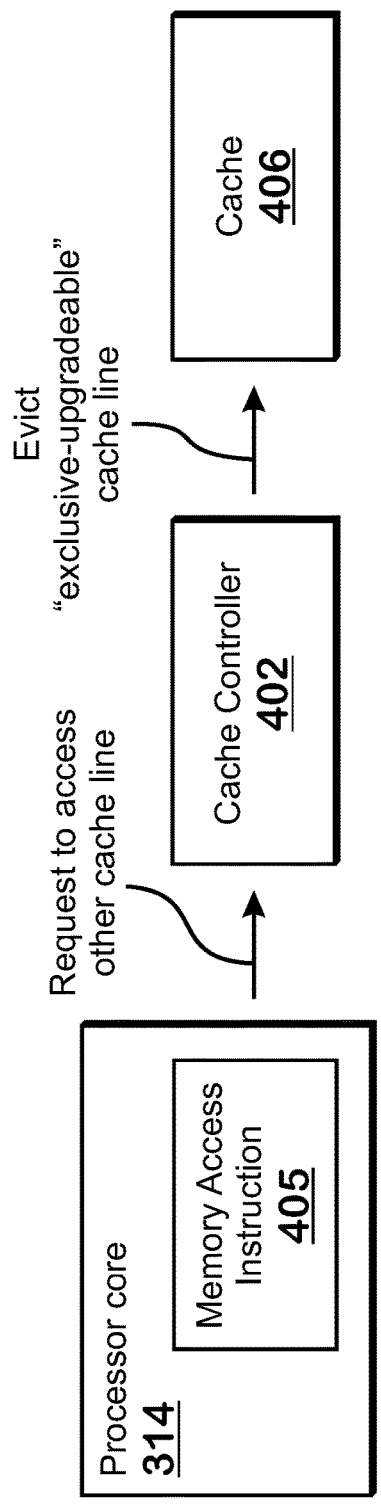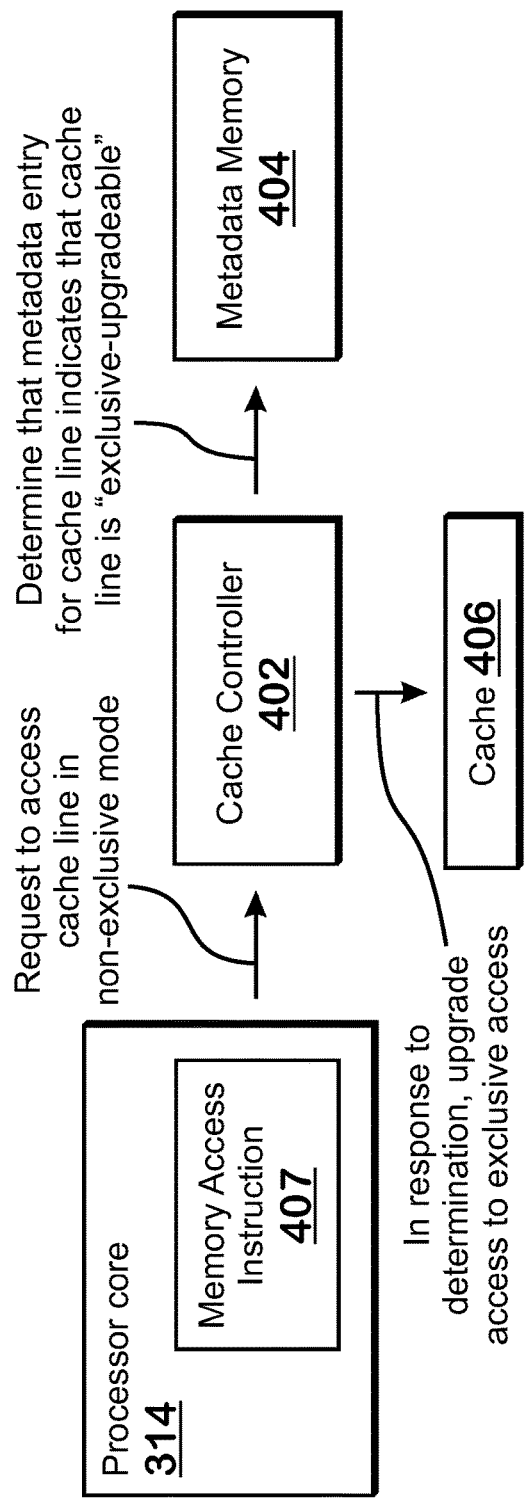
FIG. 4C
FIG. 4D

CACHE LINE COHERENCE STATE UPGRADE

BACKGROUND

Modern microprocessors implement a wide array of features for high throughput. Some such features include having highly parallel architectures and performing execution speculatively. Improvements to such features are constantly being made.

BRIEF DESCRIPTION OF THE DRAWINGS

A more detailed understanding may be had from the following description, given by way of example in conjunction with the accompanying drawings wherein:

FIGS. 4A-4D illustrate cache operations related to upgrading a cache line coherence state, according to examples.

DETAILED DESCRIPTION

Techniques for performing cache operations are provided. The techniques include, recording an entry indicating that a cache line is exclusive-upgradeable; removing the cache line from a cache; and converting a request to insert the cache line into the cache into a request to insert the cache line in the cache in an exclusive state.

Figure 1:
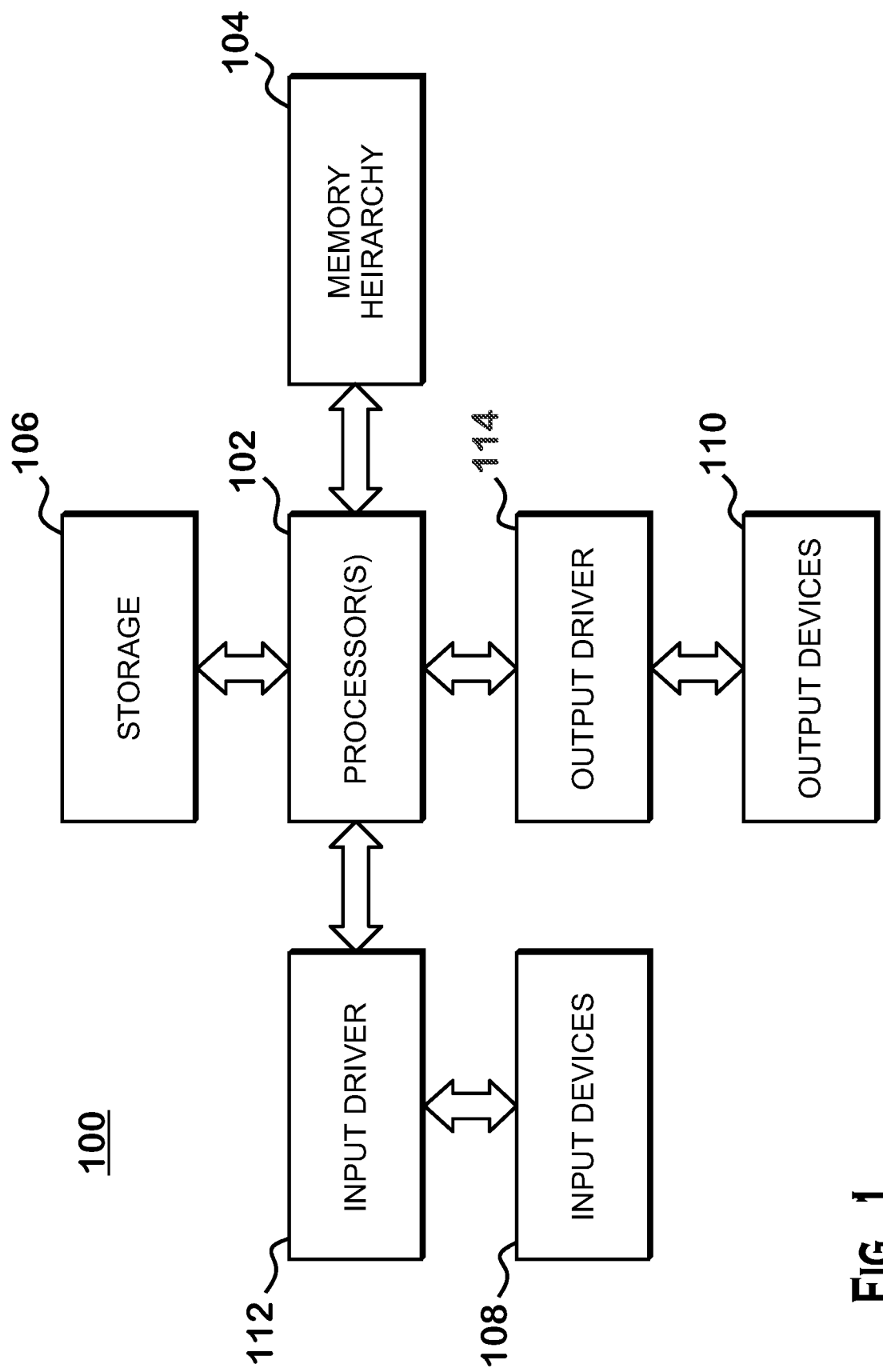
FIG. 1 is a block diagram of an example device in which one or more disclosed embodiments may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes one or more processors 102, a memory hierarchy 104, a storage device 106, one or more input devices 108, and one or more output devices 110. The device 100 may also optionally include an input driver 112 and an output driver 114. It is understood that the device 100 may include additional components not shown in FIG. 1.

The one or more processors 102 includes a central processing unit (CPU), a graphics processing unit (GPU), a CPU and GPU located on the same die, or one or more processor cores, wherein each processor core is a CPU or a GPU. In some examples, the one or more processors 102 includes any number of processors. In some examples, the one or more processors 102 includes one or more processor chips. In some examples, each processor chips includes one or more processor cores.

Part or all of the memory hierarchy 104 may be located on the same die as one or more of the one or more processors 102, or may be located partially or completely separately from the one or more processors 102. The memory hierarchy 104 includes, for example, one or more caches, one or more volatile memories, one or more non-volatile memories, and/or other memories, and may include one or more random access memories ("RAM") of one or a variety of types.

In some examples, the elements of the memory hierarchy 104 are arranged in a hierarchy that includes the elements of the one or more processors 102. Examples of such an arrangement is provided in FIGS. 3 and 4A-4D.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
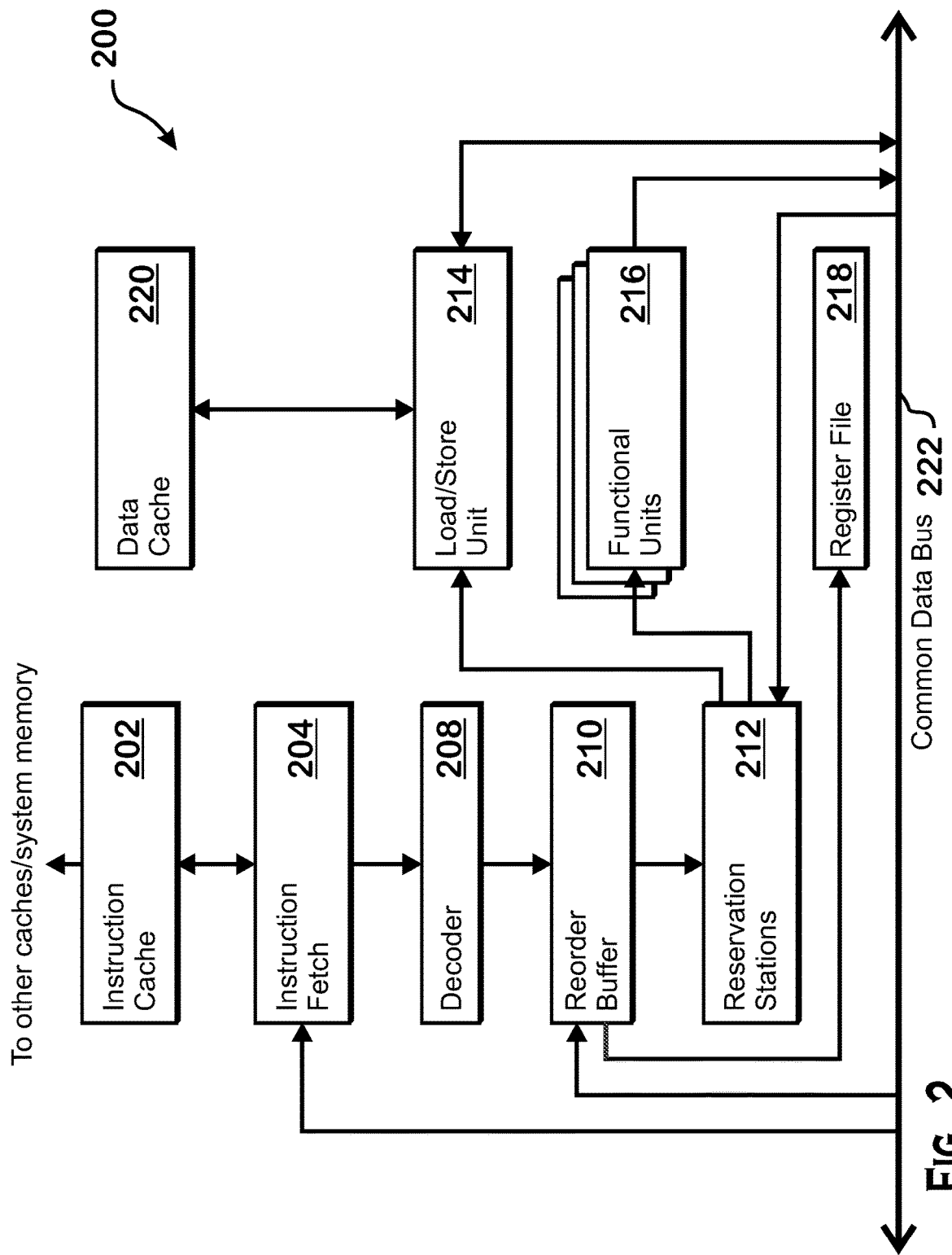
FIG. 2 is a block diagram of an instruction execution pipeline, located within the processor of FIG. 1.

FIG. 2 is a block diagram of an instruction execution pipeline 200, located within the one or more processors 102 of FIG. 1. In various examples, any of the processor cores of the one or more processors 102 of FIG. 1 are implemented as illustrated in FIG. 2.

The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch unit 204 configured to fetch instructions from system memory (such as memory 104) via an instruction cache 202, a decoder 208 configured to decode fetched instructions, functional units 216 configured to perform calculations to process the instructions, a load store unit 214, configured to load data from or store data to system memory via a data cache 220, and a register file 218, which includes registers that store working data for the instructions. A reorder buffer 210 tracks instructions that are currently in-flight and ensures in-order retirement of instructions despite allowing out-of-order execution while in-flight. "In-flight" instructions refers to instructions that have been received by the reorder buffer 210 but have not yet had results committed to the architectural state of the processor (e.g., results written to a register file, or the like). Reservation stations 212 maintain in-flight instructions and track instruction operands. When all operands are ready for execution of a particular instruction, reservation stations 212 send the instruction to a functional unit 216 or a load/store unit 214 for execution. Completed instructions are marked for retirement in the reorder buffer 210 and are retired when at the head of the reorder buffer queue 210. Retirement refers to the act of committing results of an instruction to the architectural state of the processor. For example, writing an addition result to a register, by an add instruction, writing a loaded value to a register by a load instruction, or causing instruction flow to jump to a new location, by a branch instruction, are all examples of retirement of the instruction.

Various elements of the instruction execution pipeline 200 communicate via a common data bus 222. For example, the functional units 216 and load/store unit 214 write results to the common data bus 222 which may be read by reservation stations 212 for execution of dependent instructions and by the reorder buffer 210 as the final processing result of an in-flight instruction that has finished execution. The load/store unit 214 also reads data from the common data bus 222. For example, the load/store unit 214 reads results from completed instructions from the common data bus 222 and writes the results to memory via the data cache 220 for store instructions.

Figure 3:
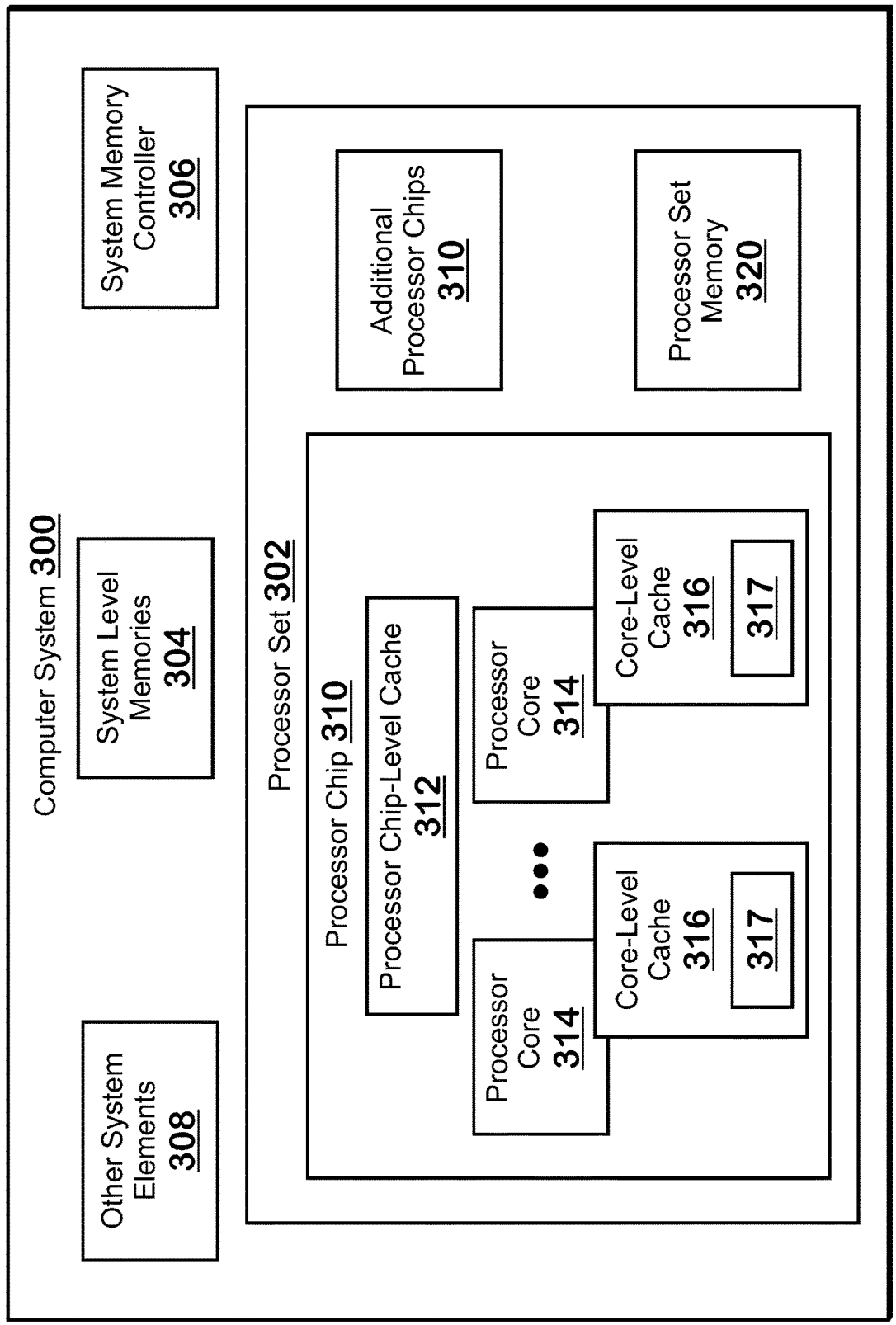
FIG. 3 is a block diagram of a computer system, according to an example.

FIG. 3 is a block diagram of a computer system 300, according to an example. In some examples, the computer system 300 is the computer system 100 of FIG. 1. The computer system 300 includes a processor set 302, one or more system-level memories 304, a system memory controller 306, and other system elements 308.

The processor set 302 includes one or more processor chips 310. Each processor chip 310 includes a processor chip-level cache 312 and one or more processor cores 314. Each processor core 314 has an associated core-level cache 316. Each of the processor cores 314 includes one or more execution pipelines such as the instruction execution pipeline 200 of FIG. 2.

The caches and memories illustrated in FIG. 3 operate in parallel and therefore use a coherence protocol to ensure data coherence. One example of such a protocol is the modified-exclusive-shared-invalid ("MESI") protocol. Each cache line includes an indication of one of these four states. The modified state indicates that the copy of the cache line stored in a particular cache is modified with respect to the copy stored in a backing memory, and thus that the cache line must be written to the backing memory when the cache line is evicted. The exclusive state indicates that the cache line is stored in a particular cache and not in any other cache at the same level of the hierarchy. It should be noted that a cache line that is marked as exclusive can be stored in a higher level of the hierarchy. For example, a cache line stored in a level 0 cache in an exclusive state can also be stored in the level 1 cache directly above the level 0 cache. The shared state indicates that the cache line is stored in multiple caches at the same level of the hierarchy. The invalid state indicates that the cache line is not valid within the particular cache where that cache line is marked invalid (although another cache can store a valid copy of that cache line).

Each processor core 314 has an associated core-level cache 316. When a processor core 314 executes a memory operation such as a load operation or a store operation, the processor core 314 determines whether the cache line that stores the data for the memory operation is located within the core-level cache 316 associated with the processor core 314. If such a cache line is not located within the core-level cache 316, then the core-level cache 316 attempts to fetch that cache line into that core-level cache 316 from a higher level cache such as the processor chip-level cache 312. The processor chip-level cache 312 serves both as a higher level cache memory and as a controller that manages the coherence protocol for the processor chip-level cache 312 and all core-level caches 316 within the same processor chip 310. Thus the processor chip-level cache 312 checks itself to determine whether the requested cache line is stored therein for the purpose of providing that cache line to the requesting processor core 314. The processor chip-level cache 312 provides the cache line to the requesting core 314 either from its own contents or once fetched from a memory that is higher up in the hierarchy.

The processor chip-level cache 312 manages the coherence protocol for the core-level caches 316. In general, the processor chip-level cache 312 manages the protocol states of the cache lines within the core-level caches 316 so that if any cache line is in an exclusive state in a particular core-level cache 316, no other core-level cache 316 has that cache line in any state except invalid. Multiple core-level caches 316 are permitted to have the cache line in a shared state.

The protocol works on a level-by-level basis. More specifically, at each level of the memory hierarchy, each element within that level is permitted to have a cache line in some subset of the states of the protocol. In an example, at the level of the processor set 302, each chip 310 (thus, each processor chip-level cache 312) is permitted to have a cache line in one of the states, such as a shared state or an exclusive state. A controller for a particular level of the hierarchy manages the protocol at that level. Thus the processor set memory 320 manages the states of the processor chip-level caches 312. The processor chip-level cache 312 for any particular processor chip 310 manages the states of the core-level caches 316, and a system memory controller 306 manages the states for the processor set 302 and other system elements 308 that may store a particular cache line.

When a processor core 314 executes a store instruction, the processor core 314 requests that the cache line that includes the data to be written to is placed into the associated core-level cache 316 in an exclusive state. If the cache line is already in the cache and is not in an exclusive state, then the request is a request to convert that cache line to an exclusive state. If the cache line is not in the cache, then the request is a request to load the cache line into the cache and to have that cache line be in an exclusive state in the cache.

In situations in which the store instruction accesses a cache line that is already in the cache, but not in an exclusive state, the act of placing that cache line into an exclusive state represents a large amount of processing work that adds to latency. In some examples this work includes requesting that the parallel caches (i.e., caches other than the caches that are "hierarchically above" the core-level cache 316) that store a copy of the cache line invalidate their copy of that cache line. A first cache is "hierarchically above" a second cache if misses in the second cache are serviced from the first cache or from a cache that is hierarchically above the first cache. The act of requesting these parallel caches to invalidate their copies is sometimes referred to herein as a "global invalidate request" or with a similar term (e.g., "global invalidate command").

For at least these reasons, techniques for mitigating the adverse effects associated with managing cache lines for store instructions are now provided. According to these techniques, the cache controller (e.g., a cache controller of the core-level cache 316) records an entry into a metadata memory 317 in the event that a cache miss occurs in the core-level cache 316, the cache line is brought into the core-level cache 316 in a non-exclusive state, and the cache line is subsequently modified to an exclusive state. The entry indicates that the cache line is considered to be "exclusive upgradeable."

A cache miss occurs in the event that a memory instruction, such as a load or a store, any instruction that reads or writes from memory, or any hardware prefetching mechanism attempts to access a cache line that is not in the core-level cache 316. To service this cache miss, the cache controller obtains the cache line from a cache or memory higher up in the cache hierarchy and places that cache line into the core-level cache 316. The cache controller also sets the coherency state for this cache line to one of the possible states, such as exclusive or shared.

As stated above, in the event that an instruction occurs that requires the cache line in an exclusive state, and the cache line is already in the cache but in a non-exclusive state, the cache controller upgrades the cache line to an exclusive state and the cache controller records in the entry for that cache line that the cache line is considered "exclusive-upgradeable." At some later time, cache line is evicted or otherwise removed from the cache (which can occur for any technically feasible reason such as due to a subsequent cache memory access that results in reading a cache line in where an eviction is required). After this, the cache line is read in again for a memory access instruction such as a load, store, or hardware prefetch. At this point, the cache controller checks the metadata memory 317 for the entry associated with the cache line. The cache controller determines that an entry exists for the cache line and that the entry indicates that the cache line is exclusive-upgradeable. In response to this determination, the cache controller reads the cache line into the cache in an exclusive state, regardless of the type of the memory access instruction.

Stated differently, the cache controller records which cache lines are read into the cache with a coherence state that is too "weak." This indication of being "too weak" indicates that because the cache line was read in in a non-exclusive state but then made exclusive, that cache line is subsequently expected to be required in an exclusive state. Thus, when a cache line that is "too weak" is read back into the cache again after eviction, the cache controller reads that cache line in an exclusive state so that the expected store instruction (or other type of instruction that requires the cache line in an exclusive state) is able to operate without the work associated with converting the coherence state of the cache line into an exclusive state.

The operations described above, with respect to FIG. 3, involve placement of a cache line into a cache. In some examples, this cache is the core-level cache 316 of FIG. 3. In other examples, any technically feasible cache is the cache that stores the cache line. In various implementations, a "store instruction" is any instruction that writes to memory and thus requires exclusive access to a cache line.

Figure 4A:
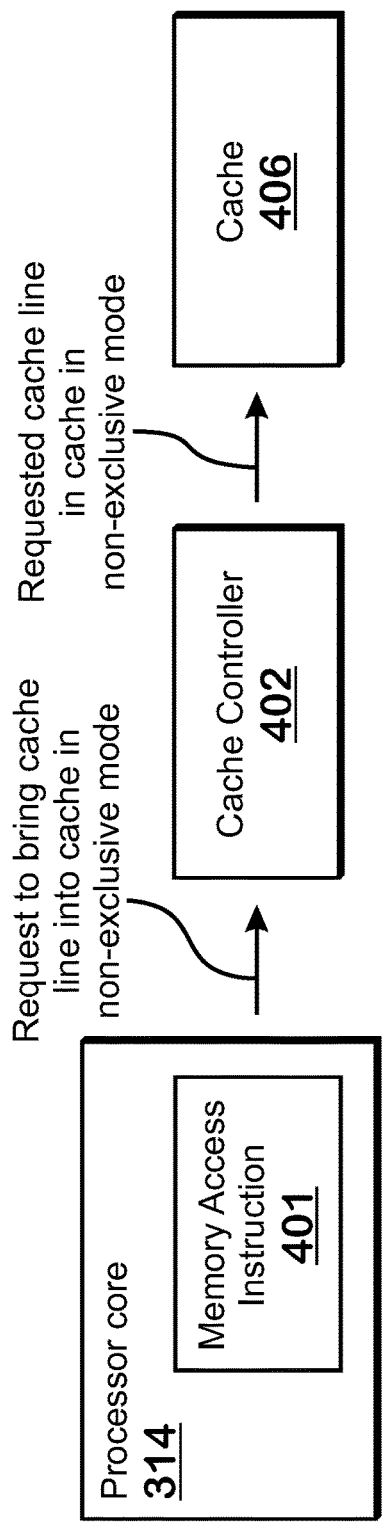

FIGS. 4A-4D illustrate example operations for "upgrading" a cache line. In some examples, the cache 406 is the core-level cache 316 of FIG. 3. In some examples, the metadata memory 404 is the metadata memory 317 of FIG. 3. FIG. 4A illustrates an operation for storing a cache line into a cache in a non-exclusive mode. In FIG. 4A, a processor core 314 executes a memory access instruction 401. The memory access instruction or hardware prefetch is directed to a memory address for which no cache line is stored in the cache 406. In addition, the memory access instruction is a type that results in the cache line being brought into the cache 406 in a non-exclusive state (such as in a shared state). An example memory access instruction that results in the cache line being brought into the cache in a non-exclusive state is a load instruction, although any technically feasible instruction or hardware prefetch could result in a cache line being brought into the cache in a non-exclusive state. Thus the cache controller 402 brings the cache line including the data requested by the memory access instruction 401 into the cache 406 and sets the coherence state for that cache line to non-exclusive. In some examples, the request to bring the cache line into the cache 406 in a non-exclusive state is a coherence state-agnostic request, and in response to such a request, the cache controller 402 is permitted to store the cache line into the cache 406 in an exclusive state or a non-exclusive state. In the instance shown in FIG. 4A, the cache line is stored in the cache 406 in a non-exclusive state.

Figure 4B:
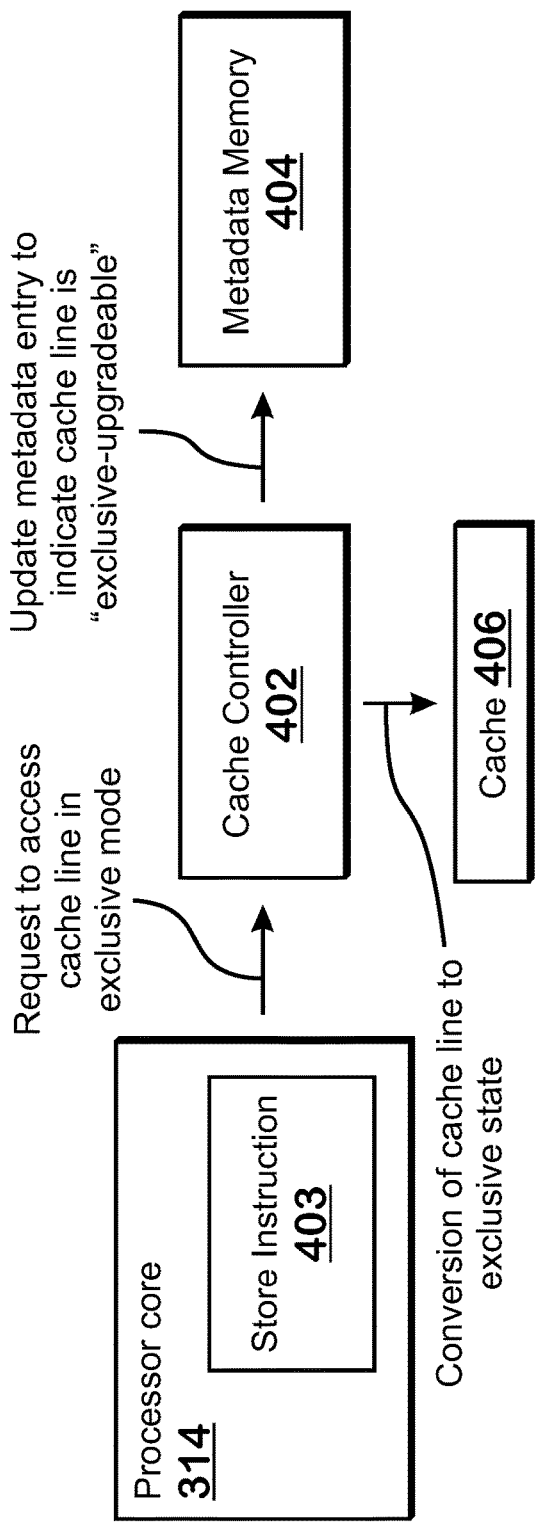

In FIG. 4B, the processor core 314 executes another memory access instruction 405. This memory access instruction 405 is a type that requires the cache line in an exclusive mode. The cache line accessed is the same cache line as the one that is read into the cache 406 in FIG. 4A. The cache controller 402 receives a request to access the cache line in an exclusive state. In response to this request, the cache controller 402 converts the cache line to an exclusive state in the cache 406. In addition, because the cache line was brought into the cache in a non-exclusive state and then upgraded to an exclusive state, the cache controller 402 records an entry in the metadata memory 404 that indicates that the cache line is "exclusive-upgradeable." In some examples, the cache controller 402 records the entry in the metadata memory 404 in response to detecting that an instruction results in the cache controller 402 sending a system-wide invalidation command (also referred to as a "global invalidation command" or "global invalidation request"). A system wide invalidation command is a command to parallel cache memories requesting that the cache lines are invalidated in order for one cache to obtain the cache line in an exclusive state.

In FIG. 4C, a memory access instruction 405 executed by the processor core 314 requests access to a cache line other than the cache line brought into the cache 406 in FIG. 4A. This access causes that other cache line to be brought into the cache 406. In addition, due to the cache replacement policies implemented for the cache 406, the cache controller 402 causes the cache line brought into the cache 406 in FIG. 4A to be evicted from the cache 406. Note that although an eviction is shown as the mechanism by which the cache line is removed from the cache 406, it is possible for any technically feasible mechanism to remove the cache line from the cache. An example is an invalidating probe, in which another processing core 314 requests access to the cache line in an exclusive state, which results in the processing core 314 shown in FIGS. 4A and 4B invalidating its own copy. The cache line being invalid is effectively the same as the cache line being removed from the cache 406.

In FIG. 4D, the processor core 314 executes a memory access instruction 407 that accesses memory of the cache line brought into the cache 406 in FIG. 4A. The cache controller 402 examines the metadata memory 404 and determines that the cache line is in an "exclusive-upgradeable" state. In response to this determination, the cache controller 402 causes the cache line requested by the memory access instruction 407 to be brought into the cache 406 in an exclusive state, regardless of whether the memory access instruction 407 is a type that requires access in an exclusive state or in a different state such as a shared state. For example, if the memory access instruction 407 is of a type that requests the cache line in a non-exclusive state or is a state-agnostic request, then the cache controller 402 "upgrades" this request to an exclusive access request, which results in the cache line being brought into the cache 406 in an exclusive state.

Figure 5:
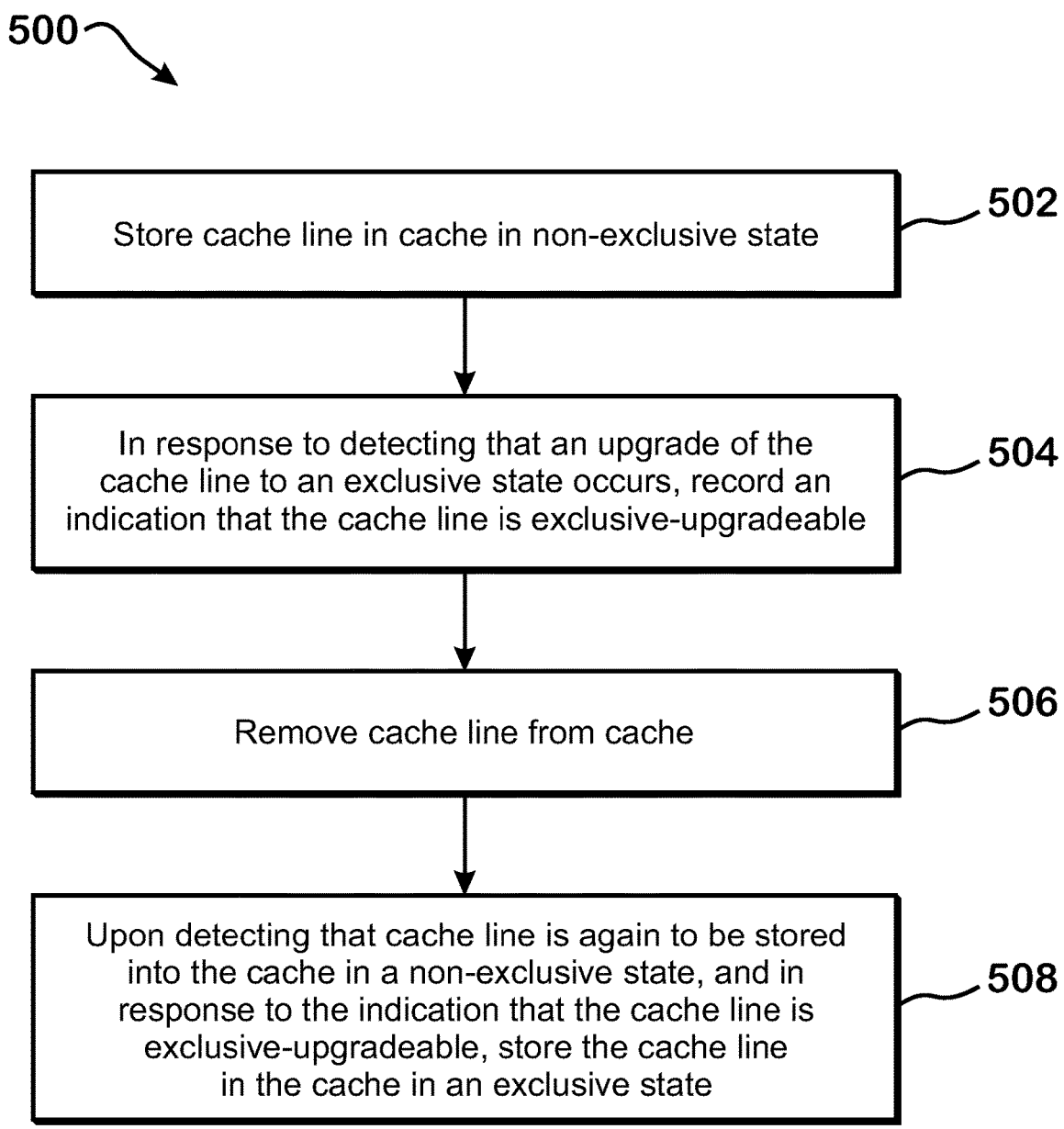
FIG. 5 is a flow diagram of a method for upgrading a cache line coherence state, according to an example.

FIG. 5 is a flow diagram of a method 500 for performing cache operations, according to an example. Although described with respect to the system of FIGS. 1-4D, those of skill in the art will understand that any system, configured to perform the steps of the method 500 in any technically feasible order, falls within the scope of the present disclosure.

At step 502, a cache 406 inserts a cache line in a non-exclusive state. A non-exclusive state is a state that does not allow writing, for example because other, parallel caches store copies of the cache line or for other reasons. In some examples, an instruction such as a load instruction executes and causes a miss in the cache 406. To service this miss, the cache controller 402 reads the cache line from another memory such as a higher cache in the hierarchy and stores that cache line into the cache 406. The cache controller 402 sets the coherence state to a non-exclusive state such as shared.

At step 504, the cache controller 402 detects that an upgrade of the cache line to an exclusive state occurs. In response to this detection, the cache controller 402 records an indication in the metadata memory 404 that the cache line is exclusive-upgradeable. In some examples, the detection that an upgrade of the cache line to an exclusive state occurs includes or is embodied as a detection that the cache controller 402 transmits a global invalidate request to other cache memories.

At step 506, the cache line of steps 502 and 504 is removed from the cache 406. In some examples, this removal is an eviction of the cache line. An eviction is a response to the cache being "too full" when another cache line is to be brought into the cache 406. More specifically, the designated "slots" for this new cache line are all occupied by cache lines that are valid, and thus the cache controller 402 is to remove one of the cache lines. The cache controller 402 evicts one of these cache lines, for example, according to an eviction policy (such as least recently used or any other technically feasible eviction policy). In another example, the cache line is removed due to being "probed away" by a different processing core 314. "Probing away" a cache line from a cache associated with a first processing core 314 by a second processing core 314 means that the second processing core 314 requests the cache line in a state that does not allow the first processing core 314 to access that cache line (such as exclusive), which thus requires that the first processing core 314 invalidates the copy of the cache line in the cache for the first processing core 314. It should be understood that step 506 includes any technically feasible reason for removing the cache line from the cache, where the term "removing" includes setting the state of the cache line to invalid.

At step 508, the cache controller 402 detects that the cache line is again to be requested to be inserted in the cache 406 (the same cache into which the cache line is stored in steps 502 and 504). In various examples, this insertion into the cache 406 occurs in response to a cache miss for a memory access instruction for a processing core 314 which is the same processing core 314 for which the operations of step 502 and step 504 occur. The cache line is to be inserted in the cache 406 in a non-exclusive state. In some examples, this inserting in a non-exclusive state is due to an instruction such as a load instruction or a hardware prefetch. In response to the indication that this cache line is in an exclusive-upgradeable state, based on the contents of the metadata memory 404, the cache controller 402 converts the request to insert the cache line in a non-exclusive state into a request to insert the cache line into the cache in an exclusive state.

In some examples, the request of step 508 to insert the cache line into the cache in a non-exclusive state, is a state-agnostic request. Such a state-agnostic request is a request to store the cache line into the cache 406 in any state, such as a non-exclusive state or an exclusive state. Thus, such a request is a request that permits a non-exclusive state or an exclusive state. In addition, in such examples, the conversion of this request is a conversion of the request to an exclusive-required request. In other words, in these examples, the cache controller 402 converts a state-agnostic request, which permits either non-exclusive or exclusive state, into an exclusive-required request, which does not permit a non-exclusive state and requires an exclusive state.

It should be understood that many variations are possible based on the disclosure herein. Although features and elements are described above in particular combinations, each feature or element may be used alone without the other features and elements or in various combinations with or without other features and elements.

The various elements illustrated in the Figures are implementable as hardware (e.g., circuitry), software executing on a processor, or a combination of hardware and software. In various examples, each block, such as the processor-memory elements 410, the processor chips 310, the system elements 308, system level memories 304, system memory controller 306, processor chip-level caches 312, processor set memory 320, processor core 314, core-level caches 316, and metadata memory 317, the cache controller 402, the metadata memory 404, and the cache 406, and the illustrated units of the instruction execution pipeline 200 and the computer system 100, are implementable as hardware (e.g., a hardware processor and/or a circuit), software, or a combination thereof. The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
    recording an entry indicating that a cache line is exclusive-upgradeable;
    removing the cache line from a cache; and
    converting a request to insert the cache line into the cache into a request to insert the cache line in the cache in an exclusive state.

2. The method of claim 1, wherein recording the entry is performed in response to upgrading the cache line to an exclusive state.

3. The method of claim 2, wherein prior to upgrading the cache line to the exclusive state, the cache line is in the cache in a non-exclusive state.

4. The method of claim 3, wherein the cache line is brought into the cache in a non-exclusive state in response to a cache miss.

5. The method of claim 3, wherein the cache line is in the cache in the non-exclusive state as a result of a memory access instruction that is a type that results in cache lines being brought into the cache in a non-exclusive state, unless the cache line is exclusive-upgradeable.

6. The method of claim 5, wherein the memory access instruction is a load instruction.

7. The method of claim 2, wherein removing the cache line from the cache is performed in response to determining that a global invalidation request is transmitted for the cache line.

8. The method of claim 2, wherein recording the entry in response to upgrading the cache line in the cache to the exclusive state comprises determining that a store instruction is performed for the cache line while the cache line is in a non-exclusive state.

9. The method of claim 2, wherein upgrading the cache line in the cache to the exclusive state is performed in response to a request to access the cache line in an exclusive state.

10. The method of claim 9, wherein the request to access the cache line in the exclusive state is associated with a store instruction.

11. The method of claim 1, wherein removing the cache line from the cache occurs due to an eviction or an invalidating probe.

12. The method of claim 1, wherein converting the request to the request to insert the cache line in the cache in the exclusive state comprises detecting the entry indicating that the cache line is exclusive-upgradeable.

13. The method of claim 1, wherein the request to insert the cache line into the cache includes a coherence state-agnostic request.

14. The method of claim 1, wherein the request to insert the cache line in the cache includes a request to insert the cache line in a non-exclusive state.

15. The method of claim 1, wherein the entry is stored in a metadata memory.

16. The method of claim 1, wherein converting the request to insert the cache line into the cache into the request to insert the cache line in the cache in the exclusive state is performed regardless of a type of the request.

17. A system, comprising:
a cache; and
a cache controller configured to:
record an entry indicating that a cache line is exclusive-upgradeable;
remove the cache line from the cache; and
convert a request to insert the cache line into the cache into a request to insert the cache line in the cache in an exclusive state.

18. The system of claim 17, wherein recording the entry is performed in response to upgrading the cache line to an exclusive state.

19. The system of claim 18, wherein prior to upgrading the cache line to the exclusive state, the cache line is in the cache in a non-exclusive state.

20. The system of claim 19, wherein the cache line is brought into the cache in a non-exclusive state in response to a cache miss.

21. The system of claim 19, wherein the cache line is in the cache in the non-exclusive state as a result of a memory access instruction that is a type that results in cache lines being brought into the cache in a non-exclusive state, unless the cache line is exclusive-upgradeable.

22. The system of claim 21, wherein the memory access instruction is a load instruction.

23. The system of claim 18, wherein removing the cache line from the cache is performed in response to determining that a global invalidation request is transmitted for the cache line.

24. The system of claim 18, wherein recording the entry in response to upgrading the cache line in the cache to the exclusive state comprises determining that a store instruction is performed for the cache line while the cache line is in a non-exclusive state.

25. The system of claim 18, wherein upgrading the cache line in the cache to the exclusive state is performed in response to a request to access the cache line in an exclusive state.

26. The system of claim 25, wherein the request to access the cache line in the exclusive state is associated with a store instruction.

27. The system of claim 17, wherein removing the cache line from the cache occurs due to or an invalidating probe.

28. The system of claim 17, wherein converting the request to the request to insert the cache line in the cache in the exclusive state comprises detecting the entry indicating that the cache line is exclusive-upgradeable.

29. The system of claim 17, wherein the request to insert the cache line in the cache includes a coherence state-agnostic request.

30. The system of claim 17, wherein the request to insert the cache line in the cache includes a request to insert the cache line in a non-exclusive state.

31. The system of claim 17, wherein the entry is stored in a metadata memory.

32. The system of claim 17, wherein converting the request to insert the cache line into the cache into the request to insert the cache line in the cache in the exclusive state is performed regardless of a type of the request.

33. A system, comprising:
a processor;
a cache; and
a cache controller configured to:
record an entry indicating that a cache line is exclusive-upgradeable;
remove the cache line from the cache; and
convert a request to insert the cache line into the cache into a request to insert the cache line in the cache in an exclusive state.

34. The system of claim 33, wherein recording the entry is performed in response to upgrading the cache line to an exclusive state.

35. The system of claim 34, wherein prior to upgrading the cache line to the exclusive state, the cache line is in the cache in a non-exclusive state.

36. The system of claim 35, wherein the cache line is brought into the cache in a non-exclusive state in response to a cache miss.

37. The system of claim 35, wherein the cache line is in the cache in the non-exclusive state as a result of a memory access instruction that is a type that results in cache lines being brought into the cache in a non-exclusive state, unless the cache line is exclusive-upgradeable.

38. The system of claim 37, wherein the memory access instruction is a load instruction.

39. The system of claim 34, wherein removing the cache line from the cache is performed in response to determining that a global invalidation request is transmitted for the cache line.

40. The system of claim 34, wherein recording the entry in response to upgrading the cache line in the cache to the exclusive state comprises determining that a store instruction is performed for the cache line while the cache line is in a non-exclusive state.

41. The system of claim 34, wherein upgrading the cache line in the cache to the exclusive state is performed in response to a request to access the cache line in an exclusive state.

42. The system of claim 41, wherein the request to access the cache line in the exclusive state is associated with a store instruction.

43. The system of claim 33, wherein removing the cache line from the cache occurs due to an eviction or an invalidating probe.

44. The system of claim 33, wherein converting the request to the request to insert the cache line in the cache in the exclusive state comprises detecting the entry indicating that the cache line is exclusive-upgradeable.

45. The system of claim 33, wherein the request to insert the cache line into the cache includes a coherence state-agnostic request.

46. The system of claim 33, wherein the request to insert the cache line in the cache includes a request to insert the cache line in a non-exclusive state.

47. The system of claim 33, wherein the entry is stored in a metadata memory.

48. The system of claim 33, wherein converting the request to insert the cache line into the cache into the request to insert the cache line in the cache in the exclusive state is performed regardless of a type of the request.

* * * * *